METHOD AND APPARATUS FOR REMOVING MOILE

Original Filed Nov. 22, 1965

Inventor
Carl E. Denlinger
By Philip M. Rice
& W. A. Schaich
Att'ys.

United States Patent Office

Re. 27,268
Reissued Jan. 11, 1972

27,268
METHOD AND APPARATUS FOR REMOVING MOILE

Carl E. Denlinger, Maumee, Ohio, assignor to Owens-Illinois, Inc.

Original No. 3,383,964, dated May 21, 1968, Ser. No. 508,942, Nov. 22, 1965. Application for reissue May 19, 1969, Ser. No. 835,863
Int. Cl. B23b *1/00, 3/04*
U.S. Cl. 82—47 10 Claims

Matter enclosed in heavy brackets [ ] appears in the original patent but forms no part of this reissue specification; matter printed in italics indicates the additions made by reissue.

*ABSTRACT OF THE DISCLOSURE*

*Apparatus for and method of removing a waste portion of "moile" from the finish of a plastic bottle. A ring-shaped waste portion is removed from the mouth opening of a container by inserting a mandrel axially into the waste portion sufficiently to engage a cutter therewith, the cutter and the container are relatively rotated to sever the waste portion from the mouth opening, the mandrel is withdrawn, and the severed waste portion or "ring" is discharged from the mandrel. Apparatus is provided for carrying out these method steps, the apparatus including a cutting means extending axially alongside but radially spaced from the mandrel for engaging the moile, and means on the mandrel for engaging the ring to insure joint mandrel-ring displacement from the finished mouth.*

The present invention relates to a method of and apparatus for removing a moile or similar waste portion from the finish of a plastic bottle. More particularly, the present invention provides an apparatus for and method of removing a moile or waste portion from a bottle formed of plastic material while preventing entry of the waste portion into the bottle during such removal.

In the manufacture of certain types of bottles, such as plastic milk bottles or the like, the parison forming and/or blow molding operation necessitate the forming of a waste portion integral with the bottle finish. This waste portion takes the form of a "moile" or "false finish" joined to the finish of the desired bottle, usually through an essentially radial sealing and pouring lip. Conventionally, this moile has been removed by merely cutting or trimming the lip at the desired location. Due to the cutting action and the forces involved therein, the moile was generally forced inside of the neck of the bottle from which it can be removed only by manual operation or by utilization of a manually actuated tool. Not only is such removal expensive, but it also effectively desterilizes food containers, such as milk bottles or the like.

The present invention now proposes a new and novel approach to the removal of this moile or false finish from the container. Essentially, the moile is engaged by a retaining element prior to the cutting operation, and, following cutting, the moile remains with the retaining element so that it cannot fall into the bottle. Means are preferably provided for automatically removing the moile from the retaining element after the element has been removed from the bottle location.

More specifically, the moile is essentially tubular in configuration to facilitate the blow molding operation, and the retaining element is inserted into the tubular moile prior to the severing operation. The retaining element is provided with a peripherally enlarged portion which is larger in over-all diameter than at least a portion of the moile interior diameter, so that any attempted displacement of the moile from the retaining element will result in frictional engagement therebetween. Further, the retaining element is provided with a knife secured thereto, and both the retaining element and the knife are rotated to sever the moile at the pouring lip location of the bottle finish. Thus, both the retaining and the severing functions can be carried out by simply displacing the retaining element and knife assembly axially relative to the bottle finish. Conversely, the moile is removed from the bottle location by the reverse axial displacement of the retaining element and the knife.

Finally, the moile is separated from the retaining element by means of an annular stripping collar which is telescopically actuatable to push the moile from the retaining element.

It is, therefore, an important object of the present invention to provide a new and novel moile severing and retaining assembly.

Another important object of the present invention is the provision of a method of and apparatus for removing the moile or false finish from a plastic container by engaging the moile with a retaining element during and after severance of the moile, jointly moving the retaining element and the moile relative to the container, and subsequently stripping the moile from the retaining element.

It is a further, and no less important, object of the present invention to provide an improved method for the removal of a container moile of tubular configuration by inserting a retaining element into the moile, the element having a peripherally enlarged portion which is larger in over-all diameter than at least a portion of the moile interior diameter, severing the moile and then removing the retaining element and the moile from the bottle location, followed by subsequently stripping the moile from the retaining element.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
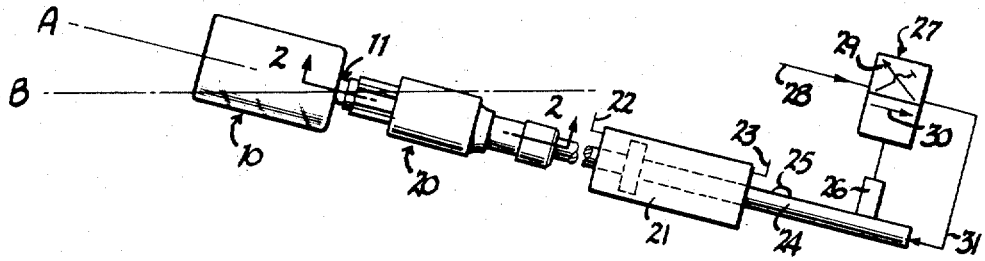
FIGURE 1 is a side elevational view of an apparatus capable of carrying out the method of the present invention.

As shown on the drawings:

In FIGURE 1 the numeral 10 refers generally to a container formed of suitable plastic material, such as polyethylene, and having a finish 11 (FIGURE 2) including a radially projecting pouring and sealing lip 12 joined to a false finish or moile 13. This moile is necessarily formed during the parison forming and/or blowing of the container 10 to its final configuration and includes an arcuate joining portion 14, joined through an inwardly directed shoulder 15 to a terminal reduced diameter portion 16.

Positioned adjacent the container 10 is a moile removal and retaining apparatus of the present invention, indicated generally by reference numeral 20. This apparatus 0 includes a fluid pressure actuated cylinder and piston ssembly 21 adapted to receive fluid under pressure hrough suitable supply lines 22, 23 in a manner well nown in the art. The actuating rod is rotated (by means ot shown) as in a drill press. The rotatable actuating od 24 of the cylinder 21 projects both forwardly and earwardly of the cylinder, the rearwardly extending por- ion thereof bearing an actuating cam 25 operable upon valve actuating element 26 to shift longitudinally a valve ody, indicated generally at 27, interposed in an air sup- ly line 28. When the valve body 27 is elevated by the am 25, a valve passage 30 interconnects the fluid supply ine 28 with a second supply line 31 for supplying fluid nder pressure to an axial bore 32 in the piston rod 24.

When the piston 24 is retracted, i.e. in its position illus- rated in FIGURE 1, the cam 25 will not contact the alve body actuating element 26 and the valve body will e in its position of FIGURE 1 at which the line 31 is ented to the atmosphere.

Figure 2:
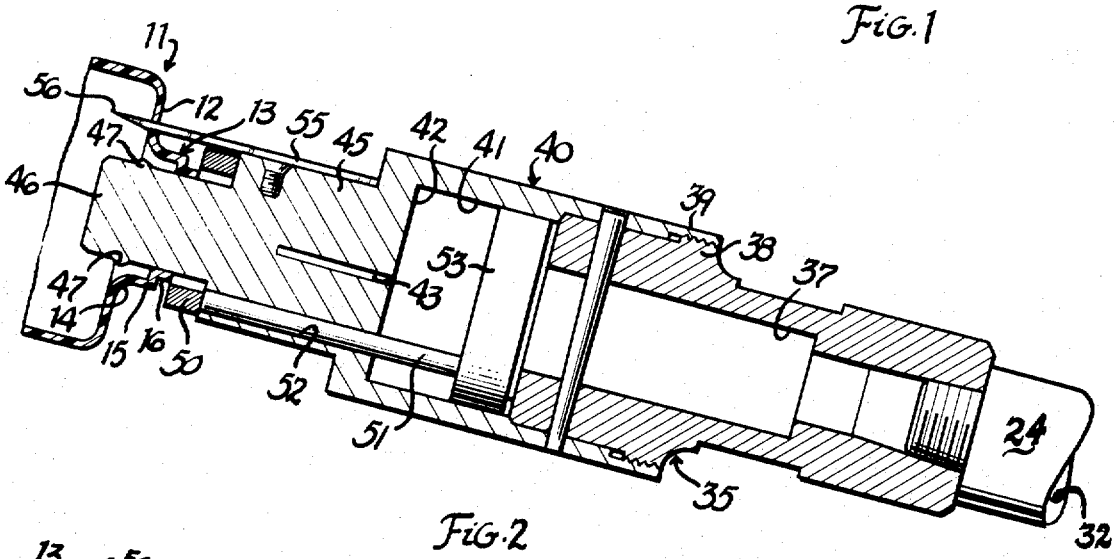
FIGURE 2 is an enlarged fragmentary sectional view taken along the plane 2—2 of FIGURE 1.

The forward end of the piston shaft 24 is coupled FIGURE 2) to the moile removal assembly. This re- noval assembly comprises a first body portion 35 pro- ided with an axial bore 37 communicating with the bore 2 in the piston rod 24 and having an exteriorly threaded eripheral shoulder 38 receiving a correspondingly in- eriorly threaded terminal portion 39 of a main body 40. he valve 40 is provided with an interior recess 41 open- ng at one end onto the passage 37 of the body 35, and losed at its other end by an end wall 42 provided with central vent passage 43. The body 40 has a reduced iameter, forwardly projecting embossment 45 terminat- ng in a second, reduced diameter projection 46 which s cylindrical in over-all configuration and which has an xterior diameter substantially the same as or slightly less han the interior diameter of the terminal portion 16 of he moile 13. The end projection 46 is provided with adially enlarged embossments or bumps 47 in the form f either a continuous ring or interrupted bumps, so that he projection is somewhat larger in over-all diameter han the interior diameter of the moile end 16.

Surrounding the embossment 46 and either of an in- erior diameter, or sufficiently recessed, to clear the en- arged diameter portion 47 thereof, is a stripper ring 50 which is annular in configuration. This ring 50 is secured o a plurality of actuating rods 51 projecting through bores 2 formed in the embossment 45. The rods 51 are se- ured at their forward ends to the stripper ring 50 and t their rear ends to an actuating piston 53 disposed in he chamber recess 41 in the body 40. Secured to the xterior surface of the body portion 45 and projecting nto substantial radial alignment with the end face of the rojection 46 is a severing knife 55 having a sharpened ower end 56.

OPERATION

In operation, the bottle 10 on the apparatus 20 is posi- ioned, as illustrated in FIGURE 1 of the drawings, i.e., he central longitudinal axis A of the bottle passing hrough the body of the bottle, the finish portion 11 and he moile portion 13 thereof is inclined downwardly with espect to a horizontal plane B through an included angle f about 15 degrees. The longitudinal axis of the appara- us 20 is similarly inclined, the apparatus thereby being xially aligned with the axis A of the bottle 10 and the omponents thereof.

Initially, the apparatus is actuated to its position illus- rated in FIGURES 1 and 2 by displacement to the left, .e., by introducing fluid under pressure through line 23 or the cylinder 21.

This extends the piston rod 24 to the left, thereby in- erting the projection 46 into the moile 13. The snug fit f the moile terminal portion 16 about the projection 46 loes not inhibit passage of the enlarged diameter 47 there- hrough because of the ramp angle of the projection and ecause of the fact that the moile is still supported by its integral attachment to the bottle finish 11. Further exten- sion of the projection 46 into the moile engages the cutting edge 56 of the knife with the point of juncture between the moile 13 and the finish 11, i.e., at the radial sealing and pouring lip 12.

Upon rotation of the entire assembly 20 relative to the bottle 10, or, alternatively, upon rotation of the bottle relative to the assembly 20, the knife 56 is moved peripherally about the lip 12 to sever the moile 13 from the finish 11. Such rotation of the shaft 24 may be continuous throughout the entire sequence of operation or may be initiated only after the position of FIGURE 2 is attained.

After severing, air under pressure is introduced through the line 22 to actuate the piston rod 24 to the right, thereby retracting, as a unit, the moile 13, the body 40 and the knife 55. Such retraction will retain the moile in position upon the projection 46 by virtue of the enlarged diameter portions 47 thereof. Thus, the moile is removed from the container 10 following severing.

Figure 3:
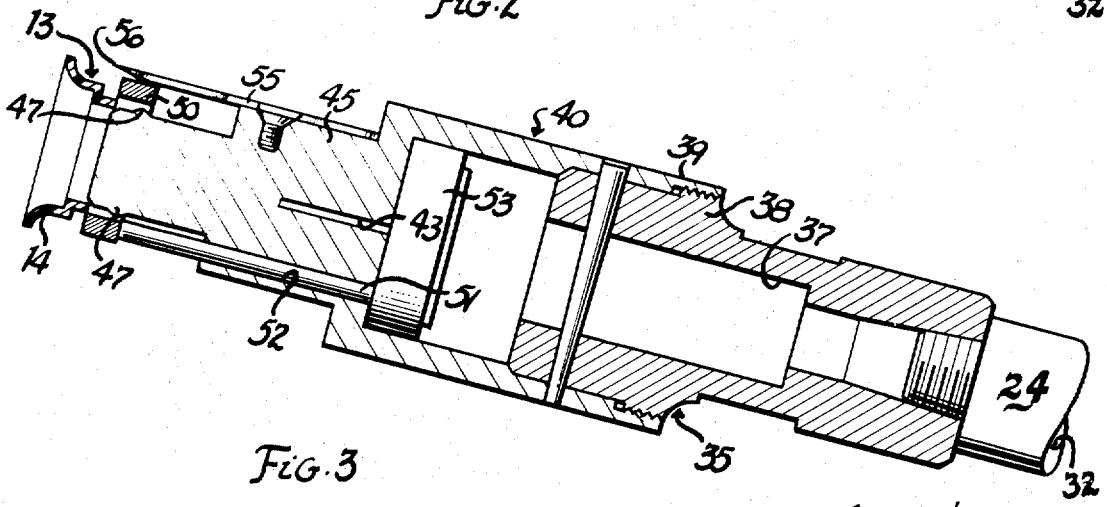
FIGURE 3 is a view similar to FIGURE 2 but illustrating the apparatus in an adjusted position.

Finally, cam 25 contacts the element 26, shifting the valve body 27 so that the valve passage 30 interconnects the air supply line 28 and the line 31, thus introducing air through the rod 24 and the passage 37 to displace the piston 53 from its position of FIGURE 2 to its position of FIGURE 3.

By so actuating the piston 53, the rods 51 displace the collar 50 telescopically downwardly over the projection 46 into abutment with the moile 13 to forcibly eject the moile from the projection 46 despite the enlarged diameter portions 47 thereof.

The device is now ready for its next actuation cycle. Upon contacting the moile of the next successive bottle, the stripping collar 50 will be actuated to its position of FIGURE 2.

I claim:

1. The method of removing from a plastic bottle a tubular moile integrally joined to the bottle finish through a radial lip, comprising the steps of advancing a moile-retaining element and a severing knife axially of the bottle, juxtaposing said element and the periphery of the moile in spaced relation to said lip, rotating at least the knife while engaging the knife with the bottle lip at the juncture of the moile and the lip, continuing to rotate the knife until the moile is severed from the lip, retracting the engaging element and the knife axially from the bottle while retaining the moile, and stripping the moile from the engaging element.

2. The method as defined in claim 1, further characterized by the engaging element being insertable into the tubular moile and having a peripherally enlarged free end which is larger in over-all diameter than at least a portion of the moile interior diameter to thereby frictionally engage at least said portion of said moile after severance thereof.

3. The method as defined in claim 2 further characterized by the engaging element and the knife being rotatable continuously throughout the steps of the method defined in claim 2.

4. The method as defined in claim 2 further characterized by performing the stripping step only after retraction of the engaging element and the knife axially from the bottle and to a predetermined location remote from the bottle radial lip.

5. The method as defined in claim 1 further characterized by the inclination of the bottle to a position at which the bottle finish is depressed below the rest of the bottle and the severed moile is moved downwardly from the finish during said retraction step.

6. An apparatus for removing from a plastic bottle a tubular moile integrally joined to the bottle finish through a radial lip comprising a shaft axially aligned with the moile, means for axially and rotationally displacing said shaft, a reduced diameter projection on said shaft insertable into said moile and having a peripherally enlarged free end which is larger in over-all diameter than at least a portion of the moile interior diameter, and a knife fixed in said shaft and engageable with the bottle at the juncture of said mole and said lip to sever the same only after said projection has been inserted into said moile.

7. An apparatus as defined in claim 6 further characterized by an annular stripper ring concentric with said projection and engageable with said moile, and means for actuating said ring telescopically over said projection to strip said moile therefrom.

8. An apparatus as defined in claim 7 further characterized by fluid pressure actuated means for telescopically moving said stripper ring over said projection, and means for actuating said actuating means at a predetermined axial position of said piston rod.

*9. Trimming apparatus for cutting a ring from a mouth opening in a container having a radial surface surrounding its mouth comprising: means for supporting the container; an axially disposed body means having a mouth entering mandrel at its one end; means for relatively axially moving said container and body means to move said mandrel into the mouth opening in the container; means for relatively revolving said body means and container; axially offset, generally axially extending cutting means carried by said body means rearwardly of said mandrel and extending axially alongside but radially spaced from said mandrel; and means carried by said body means for exerting an axial pressure on the cut-out ring for moving it outwardly of the trimmed mouth.*

*10. A method of trimming the mouth opening molded in a plastic container which has a radial surface surrounding the mouth opening comprising: moving a cutter mandrel axially in one direction into the mouth opening; moving a cutter axially in the same direction into said surface at a location spaced from but adjacent to said mouth opening; cutting through said surface around said opening to sever a generally ring-shaped part; and discharging said part in an axially opposite direction.*

References Cited

The following references, cited by the Examiner, are of record in the patented file of this patent or the original patent.

UNITED STATES PATENTS

| | | | |
|---|---|---|---|
| 448,126 | 3/1891 | Craig | 77—69 |
| 1,881,787 | 11/1932 | Mample | 77—69 X |
| 2,298,366 | 10/1942 | Gladfelter | 82—102 X |
| 2,565,274 | 8/1951 | Simpson | 82—46 |
| 2,800,812 | 7/1957 | Mueller | 77—69 |
| 3,109,232 | 11/1963 | Melvin | 82—47 X |
| 3,125,914 | 3/1964 | Wasley | 82—47 |
| 1,807,671 | 6/1931 | Phelps | 82—82 |
| 1,960,676 | 5/1934 | Kromer | 77—77 |
| 1,997,843 | 4/1935 | Warrell | 83—22 X |
| 3,127,636 | 4/1964 | Heider | 77—72 |

FOREIGN PATENTS

| | | |
|---|---|---|
| 689,471 | 6/1964 | Canada. |

HARRISON L. HINSON, Primary Examiner

U.S. Cl. X.R.

82—82; 83—22